United States Patent
Jin et al.

(10) Patent No.: US 9,701,545 B2
(45) Date of Patent: Jul. 11, 2017

(54) METHOD FOR PRODUCING CHIRAL METAL OXIDE STRUCTURE, AND CHIRAL POROUS STRUCTURE

(71) Applicant: KANAGAWA UNIVERSITY, Yokohama-shi, Kanagawa (JP)

(72) Inventors: Ren-Hua Jin, Kanagawa (JP); Hiroyuki Matsukizono, Kanagawa (JP)

(73) Assignee: Kanagawa University, Yokohama-shi, Kanagawa (JP)

( * ) Notice: Subject to any disclaimer, the term of this patent is extended or adjusted under 35 U.S.C. 154(b) by 157 days.

(21) Appl. No.: 14/438,872

(22) PCT Filed: Oct. 29, 2012

(86) PCT No.: PCT/JP2012/077829
§ 371 (c)(1),
(2) Date: Apr. 27, 2015

(87) PCT Pub. No.: WO2014/068631
PCT Pub. Date: May 8, 2014

(65) Prior Publication Data
US 2015/0291440 A1    Oct. 15, 2015

(51) Int. Cl.
| | |
|---|---|
| *B01J 21/06* | (2006.01) |
| *C01G 23/053* | (2006.01) |
| *B01J 37/08* | (2006.01) |
| *C01G 23/047* | (2006.01) |
| *C01G 23/04* | (2006.01) |
| *B01J 31/06* | (2006.01) |
| *B01J 31/22* | (2006.01) |

(52) U.S. Cl.
CPC .......... *C01G 23/053* (2013.01); *B01J 21/063* (2013.01); *B01J 37/086* (2013.01); *B01J 31/061* (2013.01); *B01J 31/2226* (2013.01); *B01J 2531/0272* (2013.01); *C01G 23/04* (2013.01); *C01G 23/047* (2013.01); *C01P 2002/72* (2013.01); *C01P 2004/03* (2013.01); *C01P 2004/50* (2013.01); *C01P 2004/64* (2013.01)

(58) Field of Classification Search
CPC .... C01G 23/04; C01G 23/043; C01G 23/047; C01G 23/053; B01J 21/063
See application file for complete search history.

(56) References Cited

U.S. PATENT DOCUMENTS

| | | |
|---|---|---|
| 2009/0043003 A1 | 2/2009 | Tatsumi et al. |
| 2009/0209665 A1 | 8/2009 | Fu et al. |
| 2011/0104401 A1 | 5/2011 | Ho et al. |

FOREIGN PATENT DOCUMENTS

| | | |
|---|---|---|
| JP | 2005239863 A | 9/2005 |
| JP | 2009030017 A | 2/2009 |
| JP | 2010059315 A | 3/2010 |
| JP | 2010208907 A | 9/2010 |

OTHER PUBLICATIONS

Kobayashi, S. et al., "Preparation of TiO2 Hollow-Fibers Using Supramolecular Assemblies," Chem. Mater., vol. 12, No. 6, May 2000, 3 pages.
Kobayashi, S. et al., "Preparation of Helical Transition-Metal Oxide Tubes Using Organogelators as Structure-Directing Agents," J. Am. Chem. Soc., vol. 124, No. 23, Jun. 2002, 2 pages.
Gabashvili, A. et al., "The Sonochemical Synthesis and Characterization of Mesoporous Chiral Titania Using a Chiral Inorganic Precurser," Ultrasonics Sonochemistry, vol. 17, No. 3, Mar. 2010, 5 pages.
Shopsowitz, K. et al., "Hard Templating of Nanocrystalline Titanium Dioxide with Chiral Nematic Ordering," Angew. Chem. Int. Ed., vol. 51, No. 28, Jul. 9, 2012, 5 pages.
ISA Japanese Patent Office, International Search Report Issued in Application No. PCT/JP2012/077829, Nov. 27, 2012, WIPO, 4 pages.

*Primary Examiner* — Matthew E Hoban
*Assistant Examiner* — James Fiorito
(74) *Attorney, Agent, or Firm* — Alleman Hall Creasman & Tuttle LLP

(57) ABSTRACT

A method for producing a chiral metal oxide structure, involves a sol-gel step of allowing a transition metal compound having a bi- or higher dentate chelate ligand to act on a chiral supramolecular crystal of an acid-base complex containing a polymer having a linear polyethyleneimine skeleton and a chiral dicarboxylic acid compound having two carboxyl groups and four or more carbon atoms to form a metal oxide layer on a surface of the chiral supramolecular crystal; and a calcination step of thermally decomposing the organic chiral supramolecular crystal after the sol-gel step to generate a transition metal oxide structure composed of the metal oxide layer prepared with the supramolecular crystal as a template.

7 Claims, 11 Drawing Sheets

METHOD FOR PRODUCING CHIRAL METAL OXIDE STRUCTURE, AND CHIRAL POROUS STRUCTURE

TECHNICAL FIELD

The present invention relates to a method for producing a chiral metal oxide structure, and a chiral porous structure.

BACKGROUND ART

Recently, many nanostructures having specific spatial shapes and nano-sized structures have been proposed, which are formed by self-assembly of organic or inorganic compounds through intermolecular interaction in an equilibrium or non-equilibrium state. These nanostructures can be used not only as base materials for constructing organic/inorganic composite nanomaterials having various compositions but also as templates to form nanostructures composed of various materials, and thus have attracted attention from interdisciplinary fields, industrial fields, etc.

As an example of such nanostructures, PTL 1 discloses a process of forming mesoporous silica particles that involves self-assembly of a surfactant having a specific structure in a solution, and a sol-gel reaction of a compound acting as a silica source around the self-assembled product. In another example, PTL 2 discloses a process of forming a porous membrane with a cylindrical structure having an average pore size of 1 to 200 nm that involves preparation of a phase-separated microstructure from two incompatible polymers, i.e., a water-soluble one and a water-insoluble one. Furthermore, it is well known that biopolymers, such as DNA and protein, are self-assembled into nanostructures having unique three-dimensional structures. However, few crystalline nanostructures are composed of polymers having crystallinity.

Growing layers of metal oxide around chiral nanostructures as templates to transfer the chirality of the templates to the metal oxide has also been proposed. For example, PTL 2 discloses a chiral organic/inorganic composite prepared by a reaction of a template polymer having an optically active chiral-oriented structure such as a helical structure with a metal source. The most successful example of a chiral metal oxide is a mesoporous silica having a twisted structure and synthesized using a chiral micelle template (PTL 3). Unfortunately, no crystalline chiral metal oxide has been proposed, although such amorphous chiral silica can be prepared with an organic chiral template. More recently, a chiral titanium oxide crystal has been proposed, for example, in NPTL 1. In this process, a silica source is applied onto nanocrystalline cellulose, which is a chiral organic crystal, and then calcined to prepare a chiral silica template. Titanium tetrachloride is then applied onto the surface of this hard template to grow a titanium oxide layer, and the silica template is removed with an aqueous sodium hydroxide solution.

CITATION LIST

Patent Literature

PTL 1: Japanese Unexamined Patent Application Publication No. 2010-208907
PTL 2: Japanese Unexamined Patent Application Publication No. 2005-239863
PTL 3: Japanese Patent No. 4607101

Non-Patent Literature

NPTL 1: Kevin E. Shopsowitz, Alexander Stahl, Wadood Y. Hamad, and Mark J. MacLachlan, Angew. Chem. *Int. Ed.*, 2012, 51, 6886-6890

SUMMARY OF INVENTION

Technical Problem

Since titanium oxide, as is well known, has catalytic and semiconducting characteristics, chiral titanium oxide crystals can be expected to be used as reaction fields to prepare chiral products and also used in the area of security as sensors sensitive only to light with a specific polarization, such as circularly-polarized light. At present, however, complicated operations, as described in NPTL 1, are required to prepare chiral metal oxide structures, such as crystals and nano-particles, from typical compounds used as transition metal sources such as titanium because they are too reactive to handle with ease.

It is an object of the present invention, which has been made in view of the above-described situation, to provide a method for preparing a chiral transition metal oxide structure by a simple technique and a chiral transition metal oxide structure prepared by such a technique.

Solution to Problem

The inventors, who have conducted intensive studies to solve the problem, have found that the use of a chiral supramolecular crystal of an acid-base type, which can be prepared from a polymer having a linear polyethyleneimine skeleton and a chiral dicarboxylic acid compound having two carboxyl groups and four or more carbon atoms, allows for the preparation of a chiral metal oxide structure by a sol-gel reaction using a transition metal complex containing a mildly reactive bi- or higher dentate chelate ligand as a metal source. Although the reason why the metal oxide structure can be prepared in this way is not fully understood, it is postulated that the supramolecular complex, which has basic secondary amino groups derived from polyethyleneimine and acidic carboxyl groups derived from dicarboxylic acid, may serve as a good reaction field for base-catalyzed and acid-catalyzed reactions, which catalyzes hydrolysis of a transition metal complex containing chelate ligands. Such a preparative method can obviate such a process of transferring the chirality of organic compounds to a hard plate as described in NPTL 1 to reduce the number of steps in the preparation of chiral metal oxide structures. More specifically, the present invention provides the following aspects.

(1) The present invention provides a method for producing a chiral metal oxide structure, involving a sol-gel step of allowing a transition metal compound having a bi- or higher dentate chelate ligand to act on a chiral supramolecular crystal of an acid-base complex containing a polymer having a linear polyethyleneimine skeleton and a chiral dicarboxylic acid compound having two carboxyl groups and four or more carbon atoms to form a metal oxide layer on a surface of the chiral supramolecular crystal; and a calcination step of thermally decomposing the organic chiral supramolecular crystal after the sol-gel step to generate a transition metal oxide structure composed of the metal oxide layer prepared with the supramolecular crystal as a template.

(2) The present invention provides a method for producing a chiral metal oxide structure according to Aspect (1), wherein the transition metal compound is a titanium compound.

(3) The present invention provides a method for producing a chiral metal oxide structure according to Aspects (1) or (2), wherein the dicarboxylic acid compound is tartaric acid.

(4) The present invention provides a method for producing a chiral metal oxide structure according to any one of Aspects (1) to (3), wherein the transition metal compound is titanium lactate and the titanium lactate is allowed to act on the chiral supramolecular crystal in the presence of a base.

(5) The present invention provides a chiral porous structure which resulted from agglomeration of primary particles of a transition metal oxide having a particle size of 1 to 100 nm observed by a field emission scanning electron microscope, wherein the chiral porous structure has a positive or negative cotton effect in a diffuse-reflection circular dichroism spectrum observed in a pulverized state.

(6) The present invention provides a chiral porous structure according to Aspect (5), wherein the transition metal oxide is titanium oxide.

Advantageous Effects of Invention

The present invention provides a method for preparing a chiral transition metal oxide structure by a simple technique and a chiral transition metal oxide structure prepared by the same method.

DESCRIPTION OF EMBODIMENTS

Figure 1:
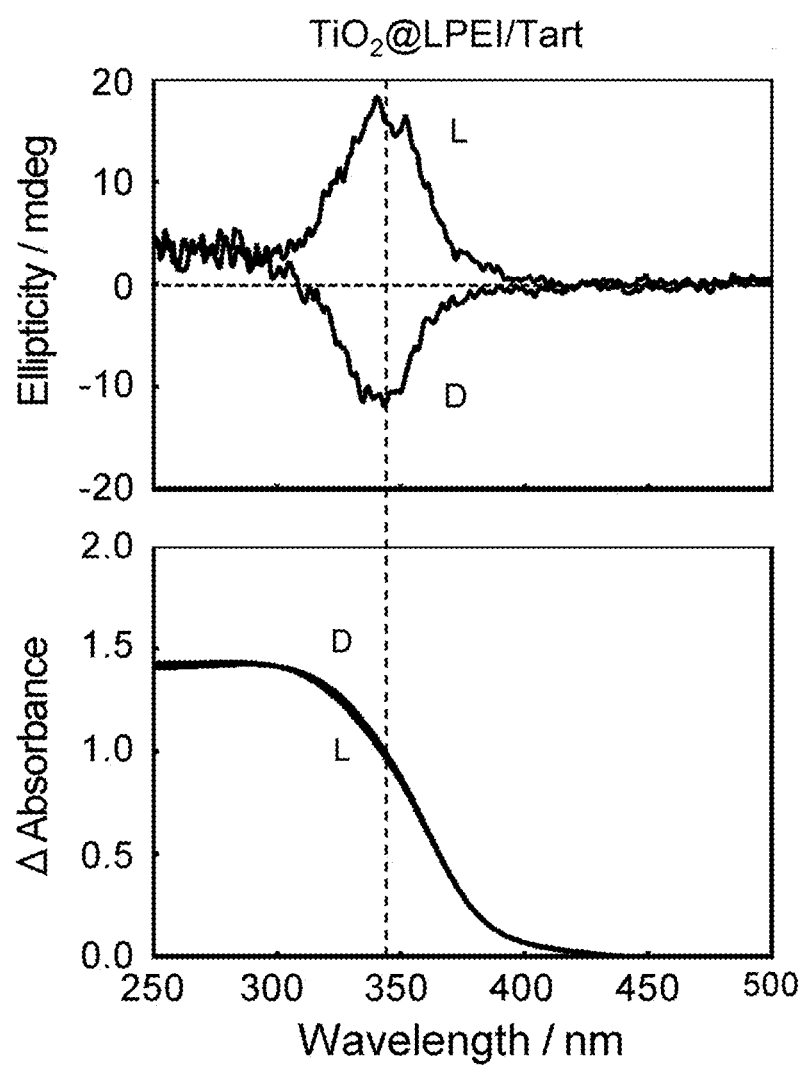
FIG. 1 illustrates a diffuse-reflection circular dichroism spectrum of a composite of LPEI, D- or L-tartaric acid, and titanium oxide.

An embodiment of a method for producing a chiral metal oxide structure and an embodiment of a chiral porous structure will now be described. The following embodiments should not be construed to limit the present invention, and appropriate modifications can be made within the scope of the present invention.

<Preparation of Chiral Metal Oxide Structure>

A method for producing a chiral metal oxide structure involves a sol-gel step of allowing a transition metal compound having a bi- or higher dentate chelate ligand to act on a chiral supramolecular crystal of the acid-base complex containing a polymer having a linear polyethyleneimine skeleton and a chiral dicarboxylic acid compound having two carboxyl groups and four or more carbon atoms to form a metal oxide layer on the surface of the chiral supramolecular crystal; and a calcination step of thermally decomposing the organic chiral supramolecular crystal after the sol-gel step to generate a transition metal oxide structure composed of the metal oxide layer prepared with the supramolecular crystal as a template. This method for producing a chiral metal oxide structure, which involves the steps described above, provides a supramolecular crystal reflecting the chirality of a dicarboxylic acid compound as a template. The chirality is transferred to the metal oxide structure formed based on the template. The chiral metal oxide structure, which has a porous structure consisting of an assembly of nanoparticles of transition metal oxides, can be used in various ways including as chiral reaction fields and as chiral semiconductor elements. The following description includes individual steps in the method for producing a chiral metal oxide structure according to the present invention.

[Sol-Gel Step]

The sol-gel step allows a transition metal compound having a bi- or higher dentate chelate ligand to act on a chiral supramolecular crystal of the acid-base complex containing a polymer having a linear polyethyleneimine skeleton and a chiral dicarboxylic acid compound having two carboxyl groups and four or more carbon atoms.

A polymer having a linear polyethyleneimine skeleton (hereinafter, also simply referred to as a "polymer") has a structure represented by the following chemical formula on a molecular basis. The unit structure denoted in the following chemical formula contains a secondary amino group, the nitrogen atom of which interacts with a carboxyl group contained in a chiral dicarboxylic acid compound to form an acid-base complex. The chiral dicarboxylic acid compound is a dibasic acid having two carboxyl groups, so that two polymers can be cross-linked through a complex formed between each carboxylic group and an amino group contained in each polymer. As a result, a chiral supramolecular crystal of the acid-base complex having a self-assembled structure composed of a plurality of polymer units and a plurality of chiral dicarboxylic acid units is formed. The supramolecular crystal has a structural chirality induced by the chiral dicarboxylic acid compounds described above.

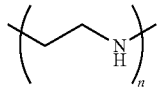

[Chemical Formula 1]

wherein n is an integer of 1 or more.

In the present invention, any polymer that has a linear polyethyleneimine skeleton represented by the chemical formula on a molecular basis can be used without structural limitations on the other parts. Examples of the polymer include star and comb structures in addition to linear structures, and homopolymers having repeating units of the chemical formula described above and copolymers having different repeating units can be used. From the viewpoint of the stability of formed crystals, preferably the copolymer has at least 20% linear polyethyleneimine skeleton units in a molar proportion, and more preferably the copolymer is a block copolymer containing at least ten linear polyethyleneimine skeleton repeating units. The polymer is most preferably a homopolymer represented by the chemical formula described above.

It is preferred that the polymer have as high of an ability as possible to form a crystalline associate with a chiral dicarboxylic acid compound described below. Accordingly, the linear polyethyleneimine skeleton parts represented by the chemical formula described above have molecular weights preferably in the range of about 500 to 1,000,000, whether the polymer is a homopolymer or a copolymer. The polymers having the linear polyethyleneimine skeletons can be commercially available products or can be prepared by the synthetic method disclosed in JP2009-30017A by the present inventors.

A chiral dicarboxylic acid compound used in the present invention has four or more carbon atoms. As previously described, the two carboxyl groups contained in the dicarboxylic acid compound cross-links polymers to form a supramolecular compound, thereby inducing the structural chirality originating from the dicarboxylic acid in the supramolecular compound. Either of D- and L-isomers of the dicarboxylic acid compound can be used. The optical purity of the dicarboxylic acid compound is not necessarily 100% ee, preferably at least 90% ee, more preferably at least 95% ee, and most preferably at least 98% ee.

The dicarboxylic acid compounds may have four or more carbon atoms, two carboxyl groups, and an asymmetric carbon, and may be linear or branched. Examples of the dicarboxylic acid compounds include tartaric acid, anthranilic acid, glucaric acid, mannaric acid, guluronic acid, idaric acid, galactaric acid, and tartronic acid. Tartaric acid is preferred.

The transition metal compound to be used in the present invention has a bi- or higher dentate chelate ligand. In general, transition metal complex compounds can react with a trace amount of water into transition metal oxides or transition metal hydroxides, and cannot be used in aqueous systems, while the transition metal complex compounds having bi- or higher dentate chelate ligands have a mild reactivity and thus can react with the chiral supramolecular complexes in aqueous systems, such as water, to form chiral transition metal oxide structures.

Any transition metal can be used for forming the transition metal complex. As is well known, many compounds containing a transition metal element exhibit catalytic activities and semiconducting characteristics, among which a superior compound is titanium oxide, which contains titanium. Titanium is a favorable metal to use from such a viewpoint. Any bi- or higher dentate chelate ligand can be used. Examples of such ligands include lactic acid, acetylacetone, ethylenediamine, bipyridine, ethylenediaminetetraacetic acid and phenanthroline, preferably lactic acid. Accordingly, a preferred example of the transition metal is titanium lactate.

This step involves a reaction of the above-described polymer with a chiral dicarboxylic acid in water to form a supramolecular crystal consisting of these compounds and water. One embodiment for forming such supramolecular crystals will now be described. This embodiment involves the following sub-steps in sequence: preparation of an aqueous polymer solution, preparation of an aqueous dicarboxylic acid solution, mixing, and precipitation. These sub-steps will now be described.

The sub-step of preparation of an aqueous polymer solution involves preparing an aqueous solution of a polymer having a linear polyethyleneimine skeleton. The water used to prepare the aqueous solution is preferably heated to 80° C. or higher. The polymer having a linear polyethyleneimine skeleton used herein has been described above.

An example procedure for preparing an aqueous polymer solution includes adding a powdered polymer into distilled water, and heating the mixture to 80° C. or higher to dissolve the polymer. The concentration of the polymer in the aqueous solution is preferably in a range of 0.5 to 8 mass %.

The prepared aqueous polymer solution is kept warm and subjected to the sub-step of mixing below.

The sub-step of preparing an aqueous dicarboxylic acid solution can preferably be performed in parallel with the sub-step of preparing the above aqueous polymer solution. This sub-step prepares the aqueous dicarboxylic acid solution described above. The carboxylic acid compound used herein is chiral (optically active). The water used to prepare the aqueous solution is preferably preheated to 80° C. or higher.

An example procedure for preparing the aqueous dicarboxylic acid solution includes adding the powdered dicarboxylic acid compound into distilled water, and heating the mixture to 80° C. or higher to dissolve the dicarboxylic acid compound. The concentration of the dicarboxylic acid compound in the aqueous solution is preferably in a range of 0.5 to 15 mass %.

The prepared aqueous dicarboxylic acid compound solution is kept warm and subjected to the sub-step of mixing below.

The sub-step of mixing involves mixing the aqueous polymer solution and the aqueous dicarboxylic acid compound solution into the mixed solution. The two aqueous solutions to be mixed are preferably preheated at 80° C. or higher.

The aqueous polymer solution and the aqueous dicarboxylic acid solution are mixed such that the equivalent of the carboxyl group in the carboxylic acid compound is in a range of preferably 0.5 to 1.5 relative to 1 equivalent of the secondary amino group in the linear polyethyleneimine skeleton of the polymer, more preferably 0.9 to 1.1, most preferably 1.

The mixed aqueous solution prepared in this sub-step is subjected to the precipitation sub-step.

The precipitation sub-step involves precipitating an acid-base complex of the polymer and the dicarboxylic acid compound in the mixed aqueous solution prepared in the mixing sub-step. The acid-base complex, as described above, is a chiral supramolecular crystal. In the following description, a "chiral supramolecular crystal" is also simply referred to as a "supramolecular crystal."

The sub-step involves gradual cooling of the mixed aqueous solution in a warmed state. Any cooling process may be employed. An exemplary cooling process includes spontaneous cooling of the solution in an air atmosphere down to the room temperature. In this process, a white solid is precipitated from the aqueous solution. The white powder is a porous composite which resulted from agglomeration of nano-sized acid-base complex crystals (supramolecular crystals). In the spontaneous cooling, the mixed aqueous solution may be left to stand, or may be stirred or vibrated to promote the precipitation of solids. The resulting white precipitate is isolated by any means such as filtration. The isolated precipitate may be washed appropriately with distilled water or an organic solvent such as, for example, ethanol or acetone, and then dried.

The resulting supramolecular crystal is allowed to react with the transition metal compound described above. This reaction is carried out by adding the supramolecular crystal to an aqueous solution containing a transitional metal compound and abase (sol-gel reaction solution) followed by stirring at room temperature. In this process, the sol-gel reaction proceeds to form a layer of the transition metal oxide on the surface of the supramolecular crystal. Although the majority of the compounds resulting from the sol-gel reaction are polymers (represented by [(-M-O—)$_n$]) consisting of a transition metal element (M) and an oxygen atom (O), the term "metal oxide" or "transition metal oxide" used herein include such polymers.

Any base can be used, preferably aqueous ammonia. Some transition metals have acidic ligands which exhibit acidity when dissolved in water. Since the supramolecular crystal, which is an acid-base complex, may be decomposed in a low pH solution, the sol-gel reaction must be carried out in the solution of pH 3 to 8 by adding a base to the sol-gel reaction solution. The base, which is added only to adjust the pH value of the sol-gel reaction solution, does not necessarily have to be added to the sol-gel reaction solution if the transition metal solution has a pH in the above-described range.

In the preparation of the sol-gel reaction solution by mixing the transition metal compound, the base, and water, the mixing ratio of these compounds may be suitably determined based on the pH of the solution. As an example, titanium lactate (Matsumoto Fine Chemical Co., Ltd., Orgatix TC-31, titanium lactate 44 mass % aqueous solution; hereinafter simply referred to as TC-310) and 1M aqueous ammonia are used as the transition metal compound and the base respectively in a volume ratio of titanium lactate (TC-310) to the base (i.e., TC-310:1M aqueous ammonia) of about 1:2 to 2:1, preferably 1:1. The volume ratio of the total of the titanium lactate and the base to water [(TC-310+1M aqueous ammonia):water] is about 1:0.5 to 1:2, preferably 1:2. The most preferable volume ratio (titanium lactate (TC-310):1M aqueous ammonia:water) is 6:6:23.

After the sol-gel step, chiral supramolecular crystals are subjected to the calcination step.

[Calcination Step]

After the sol-gel step, the calcination step allows the chiral supramolecular crystal, which is organic, to be thermally decomposed by calcination into a chiral transition metal oxide structure consisting of the metal oxide layer having the supramolecular crystal as a template. The calcination thermally decomposes the template, i.e., the chiral supramolecular crystal, to evaporate, leaving only the chiral metal oxide structure which has formed around the template. As described above, after the sol-gel step, the metal oxide layer composed of the polymer consisting of a transition metal element (M) and an oxygen atom (O) is transformed into metal oxide (titanium oxide ($TiO_2$) if titanium is used), which is a chiral metal oxide structure crystallized from the metal oxide in an amorphous state through the calcination step.

Conditions of calcination are suitably determined such that the metal oxide can be transformed into the desired crystalline state. For example, a titanium compound used as a transition metal compound can be calcined at 300 to 800° C. to crystallize into a chiral titanium oxide structure. Crystalline titanium dioxide may have either of an anatase form and a rutile form, wherein the anatase form exhibits higher catalytic activity and semiconducting characteristics than the rutile form. For the purpose of preparing the anatase crystals, the calcination condition is preferably 300 to 550° C., more preferably 500 to 550° C.

The chiral metal oxide structure after the calcination step has chirality, which is induced by the chiral supramolecular crystal used as a template and is based on a structure including atomic arrangement. In particular, the chiral titanium oxide prepared using a titanium compound as a transition metal compound has such a high catalytic activity and superior semiconducting characteristics as to be useable in various ways including as a chiral reaction field and as a chiral semiconductor element. The method for producing a chiral metal oxide structure according to the present invention can obviate the need to transfer the chirality of organic compounds to the hard plate, resulting in a reduction of the number of steps in the preparation of chiral metal oxide structures.

<Chiral Porous Structure>

Such a chiral metal oxide structure prepared by the method for producing a chiral metal oxide structure is also another aspect of the present invention. The chiral metal oxide structure is a chiral porous structure which resulted from the agglomeration of primary particles of a transition metal oxide having a particle size of 1 to 100 nm observed by a field emission scanning electron microscope. An embodiment of the chiral porous structure will now be described. It should be noted that redundant descriptions of the same portions of the method for producing a chiral metal oxide structure as described above will be omitted as appropriate and only differences will now be intensively described.

The chiral porous structure of the present invention has such a structural chirality as an atomic-level arrangement which is transferred from the chiral supramolecular crystal used as a template, and thus the chiral porous structure of the present invention exhibits a chirality even in a pulverized state prepared in a mortar. Accordingly, the chiral porous structure of the present invention exhibits a positive or negative cotton effect in a diffuse-reflection circular dichroism spectrum observed in a pulverized state. The diffuse-reflection circular dichroism spectrum may be observed after the porous structure was pulverized in a mortar and the resulting pulverized product is dispersed in KCl and KBr.

It is not entirely clear why the chiral porous structure of the present invention has such a structural chirality as an atomic-level arrangement. The growth process of the transition metal oxide crystal probably correlates with the thermal decomposition process of the chiral supramolecular crystal used as a template during calcination. The amorphous state of the transition metal oxide after the sol-gel step is converted into a crystalline state by heat in the calcination step. For example, titanium oxide is crystallized at about 150° C. into an anatase form, which is then heated to 600° C. or more to be converted into a rutile crystal form through phase transition.

It is believed that the chiral supramolecular crystal, which serves as a template, is not decomposed and still retains its structure at about 150° C. at which titanium oxide crystallizes, and thus titanium oxide in contact with the chiral supramolecular crystal, i.e., a template, initiates crystallization at 150° C. in a state which reflects the chirality of the chiral supramolecular crystal. Then, the crystallization of the titanium oxide proceeds as the calcination temperature rises. The crystallization proceeds on the formed titanium oxide crystalline as a new template, so that the chirality of the already formed titanium oxide, which reflects the supramolecular crystal, is transferred in turn, resulting in the entire crystal having such a chirality as an atomic-level arrangement. Accordingly, the chiral porous structure according to the present invention has such chirality even in the shape of pulverized product ground in a mortar. In contrast, the conventionally-proposed mesoporous crystals which express chirality due to chiral structures, such as helical structures, are believed to be caused to lose chirality if the three-dimensional structures such as the helical structures, i.e., the origin of the chirality, are destroyed by pulverization. In this regard, the chiral porous structure of the present invention is significantly different from the conventional chiral mesoporous crystals.

EXAMPLE

Hereinafter, the present invention will be described in more detail by way of examples. These examples should not be construed to limit the present invention.

[Synthesis of Linear Polyethyleneimine (LPEI)]

Commercially available polyethyloxazoline (mass average molecular weight: 50,000, average degree of polymerization: about 500, Sigma-Aldrich Co. LLC.) (30 g) was dissolved in 5M aqueous hydrochloric acid solution (150 mL). The solution was heated to 90° C. in an oil bath and agitated at that temperature for 10 hours. Subsequently, acetone (500 mL) was added to the reaction solution to completely precipitate the polymer. The precipitate was filtered and washed three times with methanol to produce white powdered polyethyleneimine. The resulting powder was analyzed by $^1$H-NMR spectroscopy (deuterium oxide) to confirm the complete disappearance of a 1.2 ppm peak ($CH_3$) and a 2.3 ppm peak ($CH_2$) derived from an ethyl group of a side chain of polyethyloxazoline. Thus, the resulting polymer was identified as polyethyleneimine, into which polyethyloxazoline had been completely hydrolyzed.

The powdered polyethyleneimine was dissolved in distilled water (50 ml) and 15% aqueous ammonia (500 ml) was added drop-wise to the solution while stirring. After the mixture was allowed to stand overnight, the precipitated polymer associate powder was filtered and washed with cold water three times. The washed crystal powder was dried in a desiccator at room temperature to produce a linear polyethyleneimine (LPEI). The yield was 22 g (containing crystallization water). The polymer associate is a supramolecular complex having a high crystallinity, which is composed of polyethyleneimine molecules which are cross-linked with one another through hydrogen bonding of water molecules with the secondary amino groups on a molecular basis. When polyoxazoline is hydrolyzed into polyethyleneimine, only the side chain reacts and the main chain does not change. Thus, the degree of polymerization of LPEI is about 500, which is the same as the degree of polymerization before hydrolysis.

Example 1

158 mg (equivalent to 2 mmol of the secondary amino groups) of powdered LPEI (water content: 46 mass %) was added to distilled water (40 mL) and the mixture was heated to about 100° C. to prepare a polymer solution containing completely dissolved LPEI. Separately, 150 mg (1 mmol) of powdered D-tartaric acid (Tokyo Chemical Industry Co., Ltd.) was dissolved in distilled water (40 mL) at about 100° C. to prepare a dicarboxylic acid solution. Then, the carboxylic acid solution was poured into the polymer solution maintained at about 100° C. to prepare an aqueous mixture. The aqueous mixture was spontaneously cooled to room temperature and then was left to stand at 4° C. overnight. The next day, the composite of the polymer and the D-tartaric acid (chiral supramolecular crystal), which was generated in the aqueous mixture, was washed with a centrifuge. A mixture of titanium lactate (manufactured by Matsumoto Fine Chemical Co., Ltd., Orgatix TC-310 (titanium lactate 44 mass % aqueous solution)):1M aqueous ammonia:water=6:6:23 (volume ratio) was added to this composite and stirred for 2 hours at room temperature. The solid component was then collected in a centrifuge, and washed with distilled water, then with acetone. After drying, 413 mg of the composite of LPEI and D-tartaric acid ($TiO_2$@LPEI/D-Tart) covered with titanium oxide was obtained.

The resulting composite ($TiO_2$@LPEI/D-Tart) was then calcined at 500° C., 600° C., or 700° C. to measure a reduced mass (%) of the composite. The results are provided in Table 1. The procedure described above was used to produce the titanium oxide structure ($TiO_2$@D).

Diffuse-reflection circular dichroism spectra were measured for the composite of LPEI, D-tartaric acid, and titanium oxide ($TiO_2$@LPEI/D-Tart) and for the titanium oxide structure prepared by calcination at 600° C. ($TiO_2$@D), each of which had been pulverized in a mortar and dispersed in KCl at a concentration of 40 mass % before the measurement. The spectra of the composite of LPEI, D-tartaric acid, and titanium oxide ($TiO_2$@LPEI/D-Tart) and the titanium oxide structures which resulted from calcination at 600° C. ($TiO_2$@D) are illustrated in FIG. 1 (reference sign (D)) and FIG. 2 (reference sign (D)), respectively.

Figure 3:
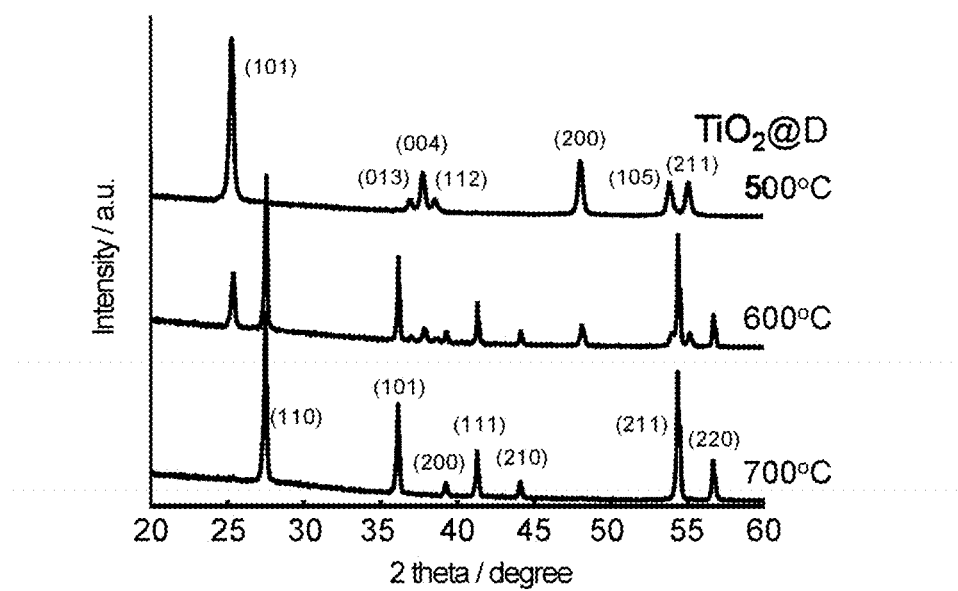
FIG. 3 illustrates XRD spectra after calcination of the titanium oxide structure ($TiO_2$@D) in Example 1.

XRD was carried out with titanium oxide structures ($TiO_2$@D) calcined at different temperatures for 3 hours. The results are provided in Table 3. FIG. 3 illustrates XRD spectra after calcination of the titanium oxide structure ($TiO_2$@D) in Example 1.

Figure 4A:
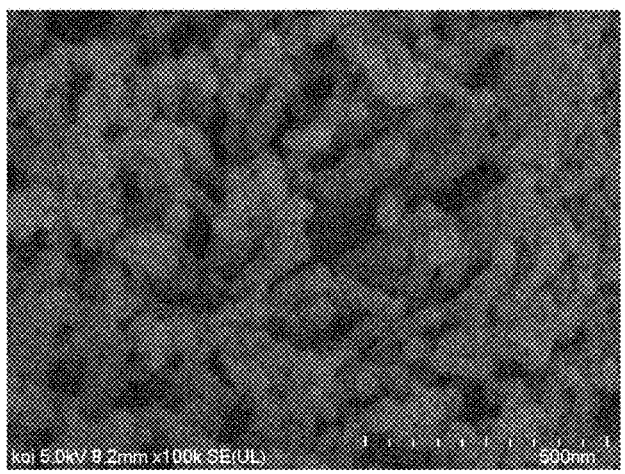
FIGS. 4A, 4B, and 4C are field emission scanning electron microscope photographs of the composite of LPEI, D-tartaric acid, and titanium oxide ($TiO_2$@LPEI/D-Tart) in Example 1. The magnification of the images decreases in the order of 4A, 4B, and 4C.
Figure 4B:
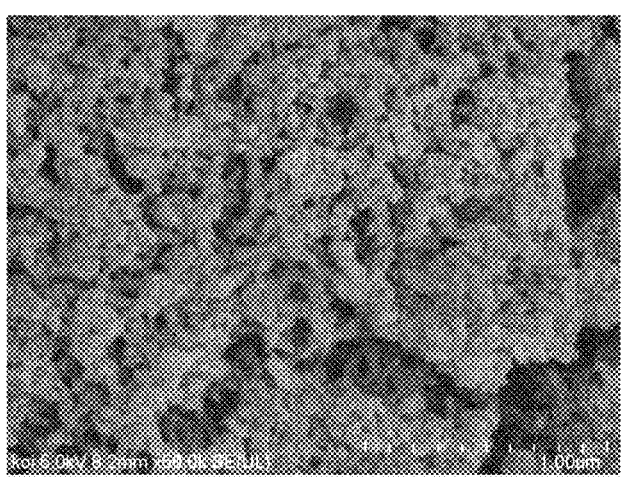
Figure 4C:
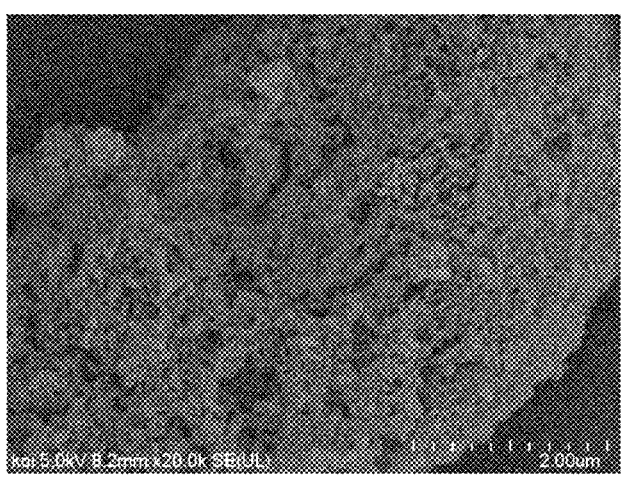
Figure 5A:
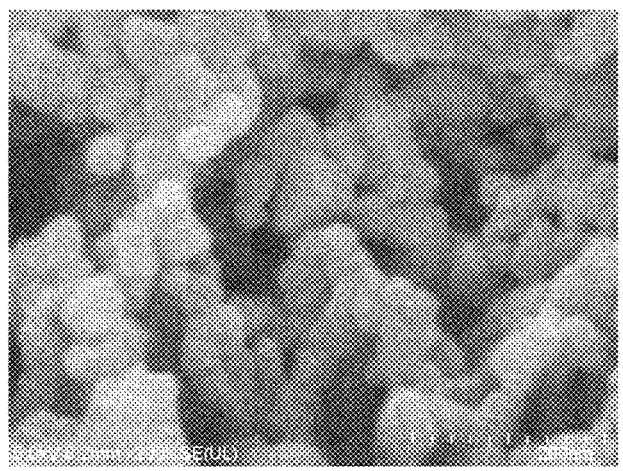
FIGS. 5A, 5B, and 5C are field emission scanning electron microscope photographs of the titanium oxide structure ($TiO_2$@D) prepared by calcination at 600° C. in Example 1. The magnification of the images decreases in the order of 5A, 5B, and 5C.
Figure 5B:
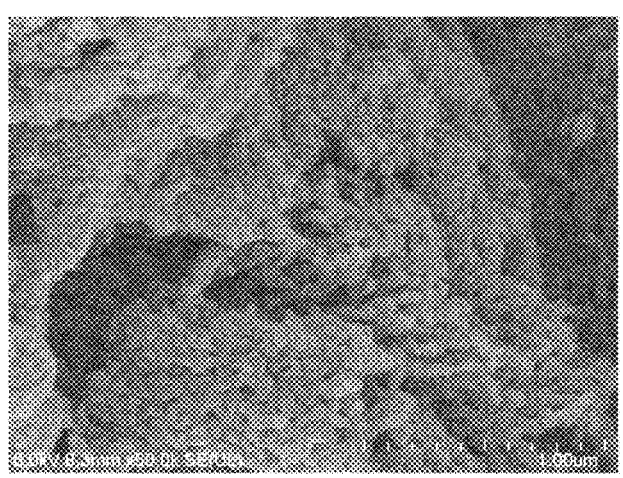
Figure 5C:
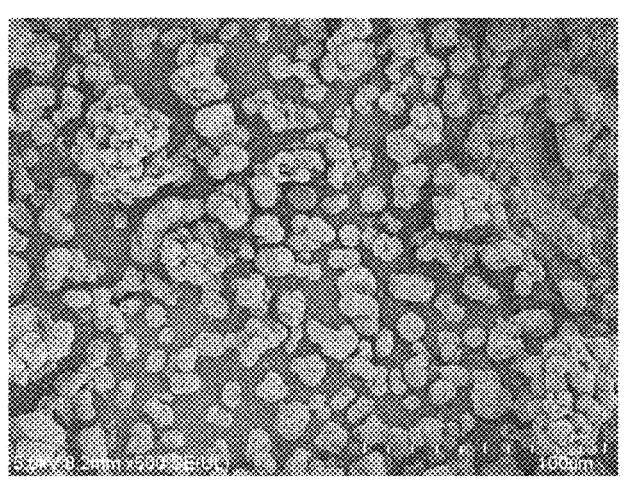

FIG. 4A to 4C and FIGS. 5A to 5C show the results, observed with a field emission scanning electron microscope (manufactured by Hitachi Ltd., SU8010), on the composite of LPEI, D-tartaric acid, and titanium oxide ($TiO_2$@LPEI/D-Tart), and for the titanium oxide structure ($TiO_2$@D) prepared by calcination at 600° C., respectively. FIG. 4A to 4C are field emission scanning electron microscope photographs of the composite of LPEI, D-tartaric acid, and titanium oxide ($TiO_2$@LPEI/D-Tart) in Example 1. The magnification of the images decreases in the order of 4A, 4B, and 4C. FIGS. 5A to 5C are field emission scanning electron microscope photographs of the titanium oxide structure (TiO$_2$@D) prepared by calcination at 600° C. in Example 1. The magnification of the images decreases in the order of 5A, 5B, and 5C.

Example 2

A composite of LPEI, L-tartaric acid, and titanium oxide (TiO$_2$@LPEI/L-Tart) and a titanium oxide structure (TiO$_2$@L) were prepared as in Example 1 except that L-tartaric acid (Tokyo Chemical Industry Co., Ltd.) was used instead of D-tartaric acid. The yield of the composite of LPEI, L-tartaric acid, and titanium oxide was 537 mg. The reduced mass (%) of the composite after calcination is shown in Table 1.

Diffuse-reflection circular dichroism spectra were obtained of the composite of LPEI, L-tartaric acid, and titanium oxide (TiO$_2$@LPEI/L-Tart) and the titanium oxide structure prepared by calcination at 600° C. (TiO$_2$@L), each of which had been pulverized in a mortar and dispersed in KCl at a concentration of 40 mass % before measurement. FIG. 1 (Reference sign (L)) and FIG. 2 (Reference sign (L)), respectively, illustrate the spectra of the composite of LPEI, L-tartaric acid, and titanium oxide (TiO$_2$@LPEI/L-Tart) and the titanium oxide structures which resulted from calcination at 600° C. (TiO$_2$@L).

Figure 6:
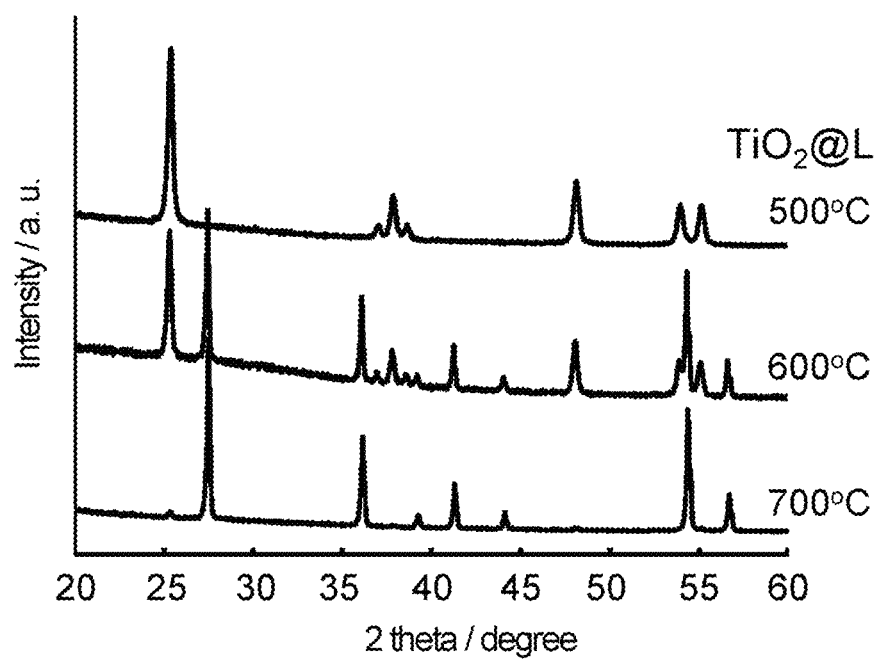
FIG. 6 illustrates XRD spectra after calcination of a titanium oxide structure ($TiO_2$@L) in Example 2.

XRD was carried out with titanium oxide structures (TiO$_2$@L) calcined at different temperatures for 3 hours. The results are provided in Table 6. FIG. 6 illustrates XRD spectra after calcination of the titanium oxide structure (TiO$_2$@L) in Example 2.

Figure 7A:
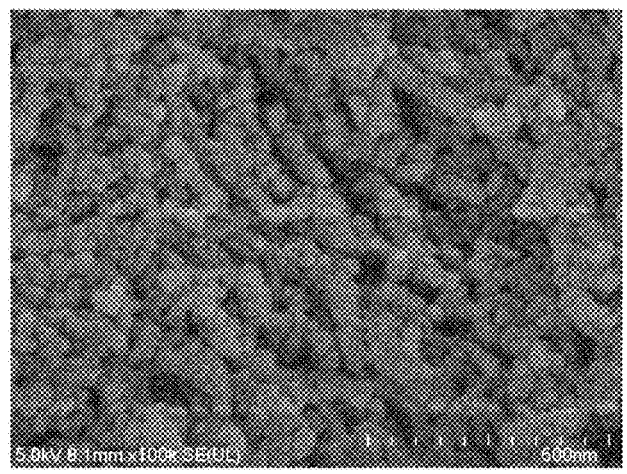
FIGS. 7A, 7B, and 7C are field emission scanning electron microscope photographs of the composite of LPEI, L-tartaric acid, and titanium oxide ($TiO_2$@LPEI/L-Tart) in Example 2. The magnification of the images decreases in the order of 7A, 7B, and 7C.
Figure 7B:
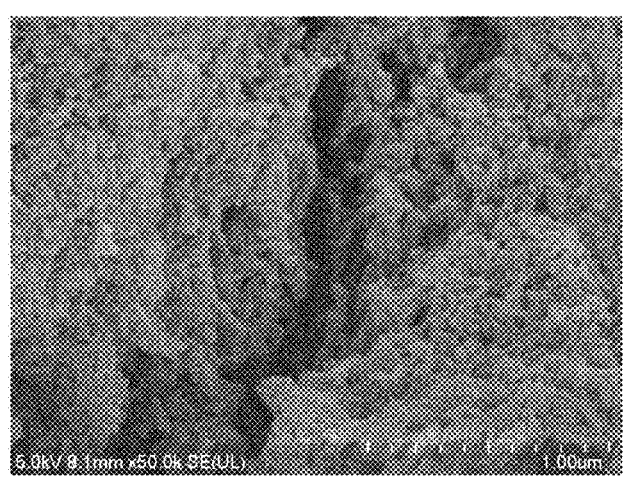
Figure 7C:
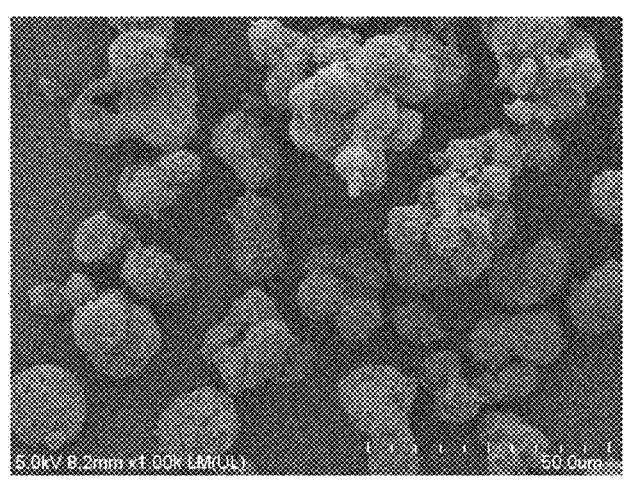
Figure 8A:
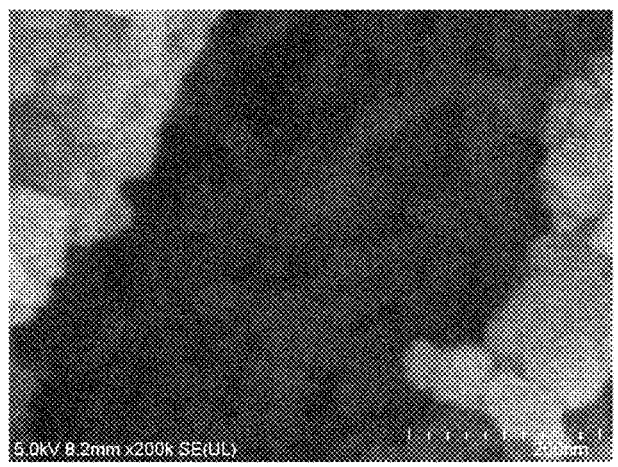
FIGS. 8A, 8B, and 8C are field emission scanning electron microscope photographs of the titanium oxide structure ($TiO_2$@L) prepared by calcination at 600° C. in Example 2. The magnification of the images decreases in the order of 8A, 8B, and 8C.
Figure 8B:
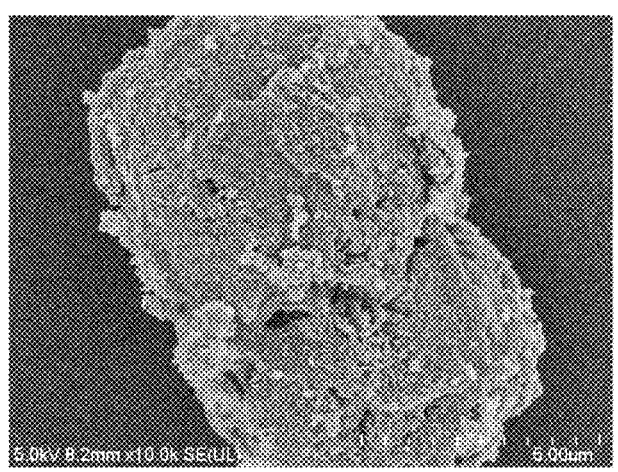
Figure 8C:
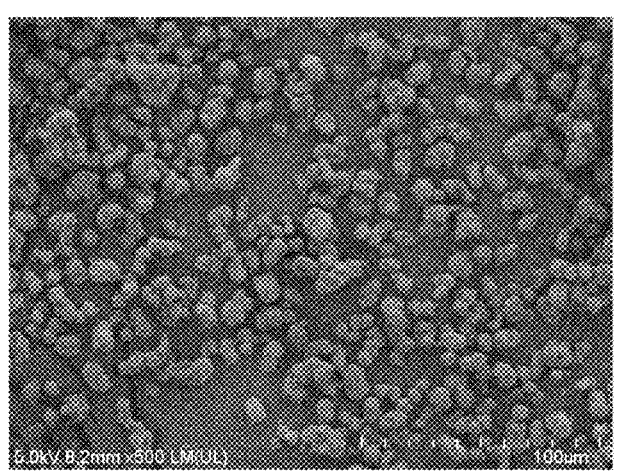

FIG. 7A to 7C and FIGS. 8A to 8C show the field emission scanning electron microscopic results on the composite of LPEI, L-tartaric acid, and titanium oxide (TiO$_2$@LPEI/L-Tart), and for the titanium oxide structure (TiO$_2$@L) prepared by calcination at 600° C., respectively. FIGS. 7A to 7C are field emission scanning electron microscopic photographs of the composite of LPEI, L-tartaric acid, and titanium oxide (TiO$_2$@LPEI/L-Tart) in Example 2. The magnification of the images decreases in the order of 7A, 7B, and 7C. FIGS. 8A to 8C are field emission scanning electron microscope photographs of the titanium oxide structure (TiO$_2$@L) prepared by calcination at 600° C. in Example 2. The magnification of the images decreases in the order of 8A, 8B, and 8C.

Reference Example 1

A composite of LPEI and DL-tartaric acid (TiO$_2$@LPEI/DL-Tart), and a titanium oxide structure (TiO$_2$@DL), were prepared as in Example 1 except that DL-tartaric acid (Tokyo Chemical Industry Co., Ltd.) was used instead of D-tartaric acid. The reduced mass (%) of the composite after calcination is shown in Table 1.

Figure 9:
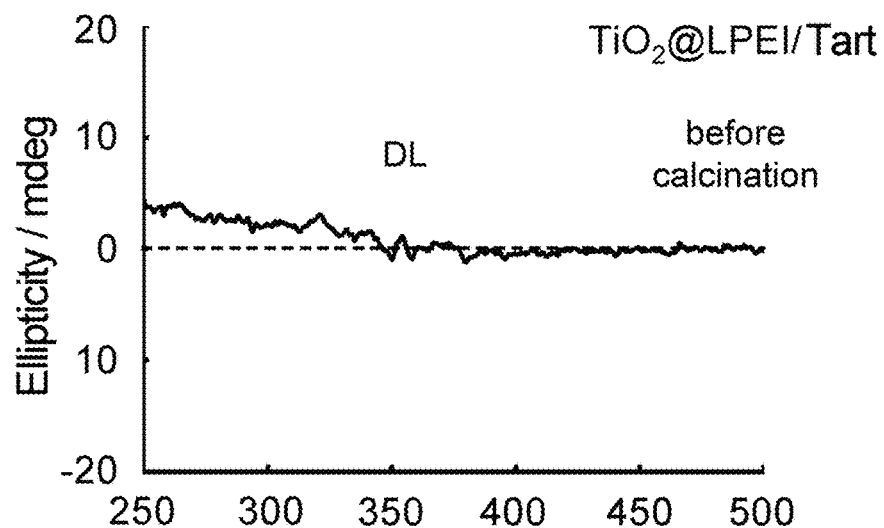
FIG. 9 illustrates a diffuse-reflection circular dichroism spectrum of a composite of LPEI, DL-tartaric acid, and titanium oxide.
Figure 10:
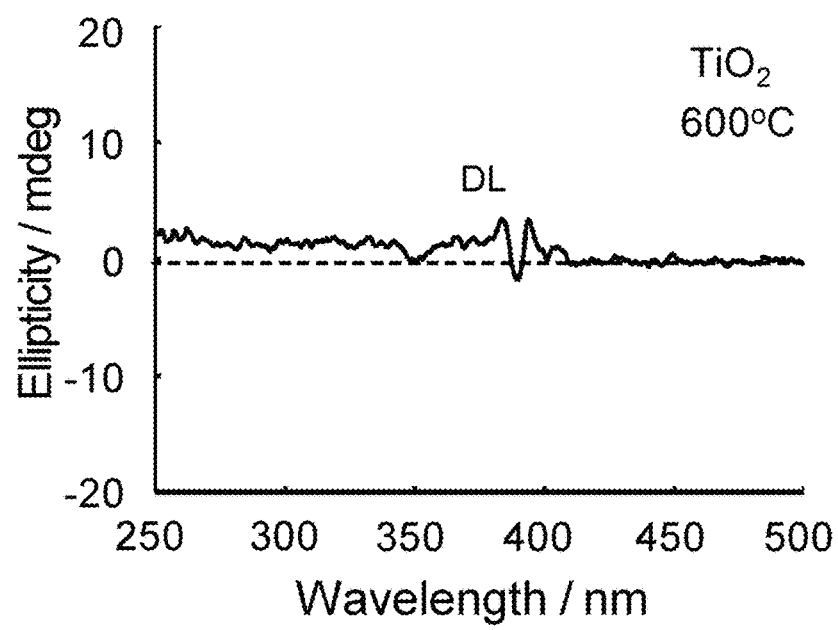
FIG. 10 illustrates a diffuse-reflection circular dichroism spectrum after calcination of a composite of LPEI, DL-tartaric acid, and titanium oxide.

Diffuse-reflection circular dichroism spectra were measured for the composite of LPEI, DL-tartaric acid, and titanium oxide (TiO$_2$@LPEI/DL-Tart) and for the titanium oxide structure prepared by calcination at 600° C. (TiO$_2$@DL), each of which had been pulverized in a mortar and dispersed in KCl at a concentration of 40 mass % before the measurement. FIG. 9 and FIG. 10, respectively, illustrate the spectra of the composite of LPEI, DL-tartaric acid, and titanium oxide (TiO$_2$@LPEI/DL-Tart) and the titanium oxide structures formed through calcination at 600° C. (TiO$_2$@DL).

Figure 11:
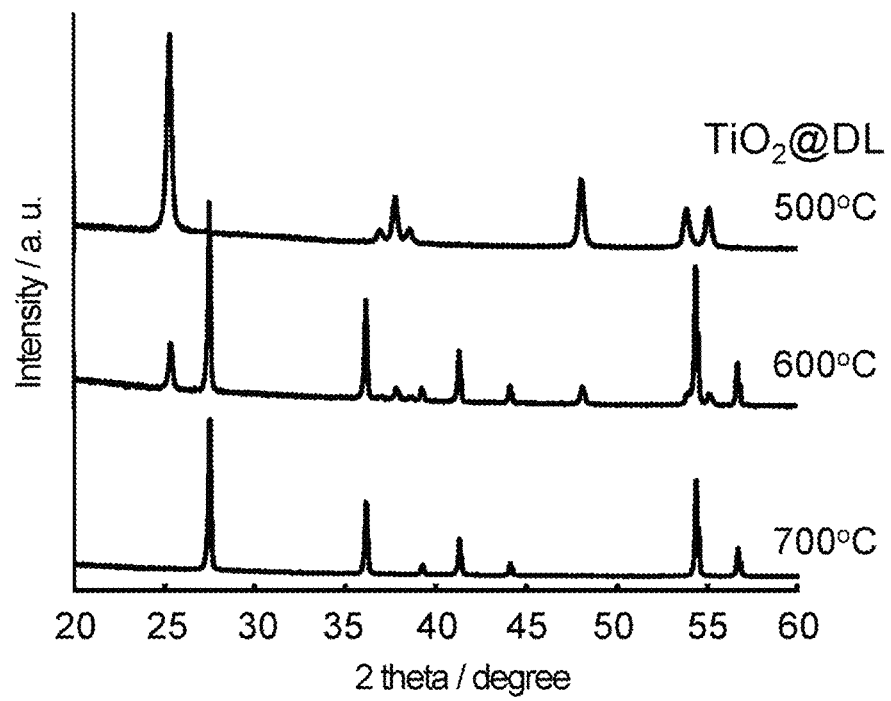
FIG. 11 illustrates XRD spectra after calcination of a titanium oxide structure ($TiO_2$@DL) in Reference Example 1.
Figure 12C:
FIGS. 12A, 12B, 12C, 12D, and 12E are field emission scanning electron microscope photographs of an LPEI/DL-tartaric acid composite ($TiO_2$@LPEI/DL-Tart) in Reference Example 1. The magnification of the images decreases in the order of 12A, 12B, 12C, 12D, and 12E.
Figure 12B:
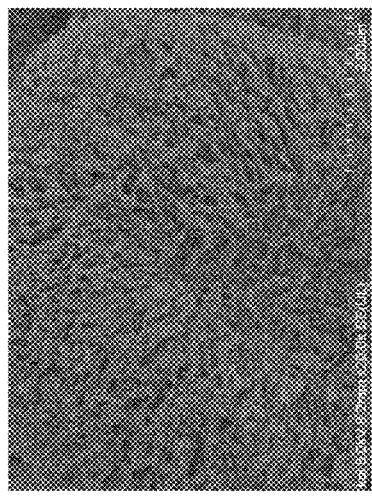
Figure 12E:
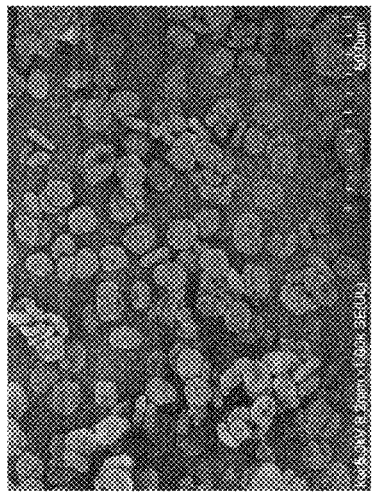
Figure 12A:
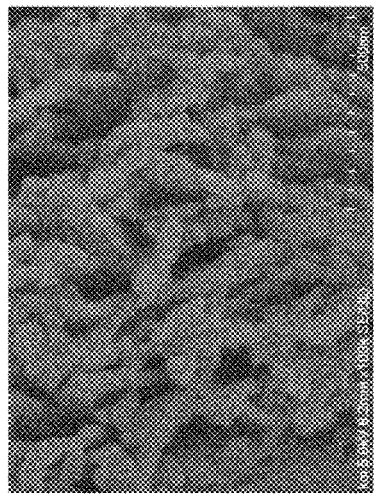
Figure 12D:
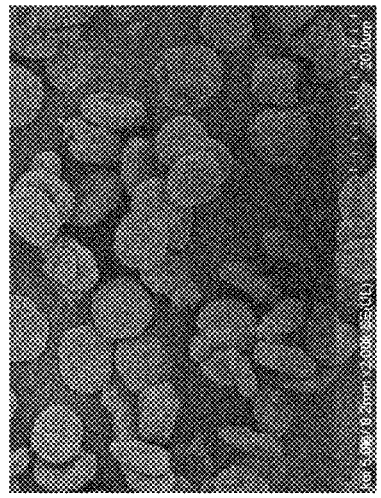

XRD was carried out for each of the titanium oxide structures (TiO$_2$@DL) calcined for 3 hours at different temperatures. The results are provided in FIG. 11. FIG. 11 is the XRD spectra of titanium oxide structures (TiO$_2$@DL) prepared by calcination in Reference Example 1.

FIGS. 12A to 12E show the field emission scanning electron microscope results on the composite of LPEI, DL-tartaric acid, and titanium oxide (TiO$_2$@LPEI/DL-Tart). FIGS. 12A to 12E are field emission scanning electron microscopic photographs of an LPEI/DL-tartaric acid composite (TiO$_2$@LPEI/DL-Tart) in Reference Example 1. The magnification of the images decreases in the order of 12A, 12B, 12C, 12D, and 12E.

TABLE 1

| Tartaric Acid | Reduced mass after calcination (%) | | |
|---|---|---|---|
| | 500° C. | 600° C. | 700° C. |
| D | 51 | 52 | 53 |
| L | 44 | 44 | 50 |
| DL | 51 | 51 | 52 |

Figure 2:
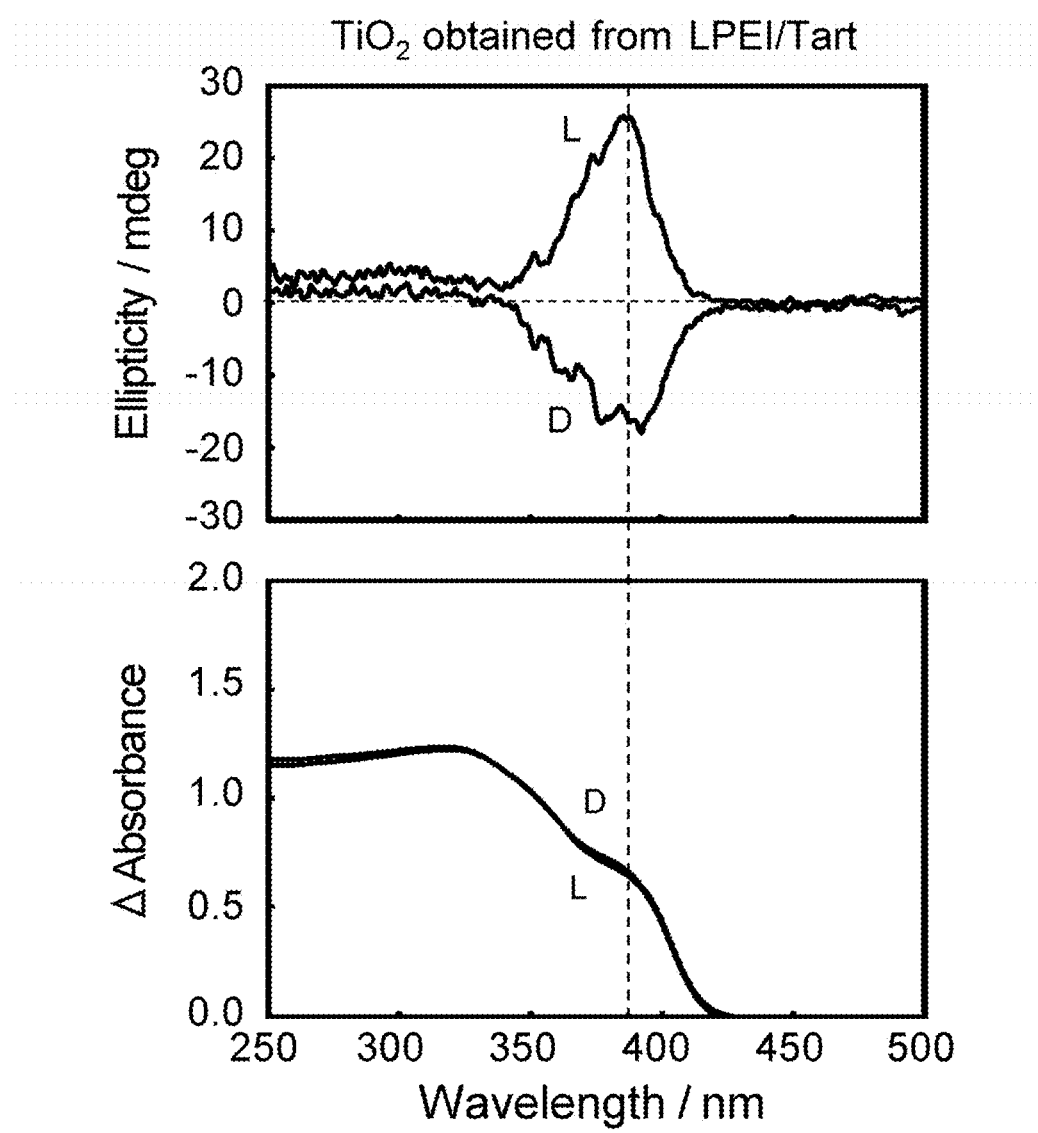
FIG. 2 illustrates diffuse-reflection circular dichroism spectra of a titanium oxide structure which resulted from calcination of the composite of LPEI, D- or L-tartaric acid, and titanium oxide.

FIG. 1 and FIG. 2 demonstrate that the resulting composite and the metal oxide structure after calcination at 600° C. have circular dichroism spectra according to their respective chirality. In particular, FIG. 2 demonstrates that the metal oxide structure according to the present invention exhibits a circular dichroism spectrum according to its respective chirality even in a pulverized state from being ground in a mortar. Accordingly, the resulting metal oxide structure has such a chirality as an atomic-level arrangement. In contrast, FIG. 9 and FIG. 10 show that no circular dichroism spectra were observed for the resulting composite and metal oxide structure prepared by calcination with racemic tartaric acid at 600° C. Thus, the titanium oxide which resulted from a composite based on a racemic tartaric acid was optically inactive.

As is illustrated in FIG. 3 and FIG. 6, anatase titanium oxide is formed by calcination of the resulting composite at 500° C. yields and rutile titanium oxide is formed by calcination at a temperature in the range of 600° C. to 700° C.

As is shown in FIGS. 4A to 4C and FIGS. 7A to 7C, the metal oxide structure of the titanium oxide prepared by the method of the present invention is a porous structure which resulted from the agglomeration of primary particles of titanium oxide having a particle size of 1 to 100 nm.

The invention claimed is:

1. A method for producing a chiral metal oxide structure, comprising:
   a sol-gel step of allowing a transition metal compound having a bi- or higher dentate chelate ligand to act on a chiral supramolecular crystal of an acid-base complex containing a polymer having a linear polyethyleneimine skeleton and a chiral dicarboxylic acid compound having two carboxyl groups and four or more carbon atoms to form a metal oxide layer on a surface of the chiral supramolecular crystal; and
   a calcination step of thermally decomposing the organic chiral supramolecular crystal after the sol-gel step to generate a transition metal oxide structure composed of the metal oxide layer prepared with the supramolecular crystal as a template.

2. The method for producing a chiral metal oxide structure according to claim 1, wherein the transition metal compound is a titanium compound.

3. The method for producing a chiral metal oxide structure according to claim 1, wherein the dicarboxylic acid compound is tartaric acid.

4. The method for producing a chiral metal oxide structure according to claim 1, wherein the transition metal compound is titanium lactate and the titanium lactate is allowed to act on the chiral supramolecular crystal in the presence of a base.

5. The method for producing a chiral metal oxide structure according to claim 2, wherein the dicarboxylic acid compound is tartaric acid.

6. The method for producing a chiral metal oxide structure according to claim 2, wherein the transition metal compound is titanium lactate and the titanium lactate is allowed to act on the chiral supramolecular crystal in the presence of a base.

7. The method for producing a chiral metal oxide structure according to claim 3, wherein the transition metal compound is titanium lactate and the titanium lactate is allowed to act on the chiral supramolecular crystal in the presence of a base.

* * * * *